United States Patent
Patel et al.

(10) Patent No.: US 9,667,128 B2
(45) Date of Patent: *May 30, 2017

(54) POWER CONVERTER RESONANCE DETECTION APPARATUS AND METHOD

(75) Inventors: Yogesh Popatlal Patel, Grafton, WI (US); Lixiang Wei, Whitefish Bay, WI (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 1326 days.

This patent is subject to a terminal disclaimer.

(21) Appl. No.: 13/570,919

(22) Filed: Aug. 9, 2012

(65) Prior Publication Data

US 2013/0289911 A1     Oct. 31, 2013

Related U.S. Application Data

(60) Provisional application No. 61/640,456, filed on Apr. 30, 2012.

(51) Int. Cl.
| | | |
|---|---|---|
| *G01R 23/08* | (2006.01) | |
| *H02M 1/12* | (2006.01) | |
| *H02M 5/458* | (2006.01) | |

(52) U.S. Cl.
CPC ......... *H02M 1/126* (2013.01); *H02M 5/4585* (2013.01)

(58) Field of Classification Search
CPC .......... H02M 1/12; H02M 1/14; H02M 1/126; H02M 2001/123; H02J 1/02; H02J 3/01
USPC ........................................................ 307/105
See application file for complete search history.

(56) References Cited

U.S. PATENT DOCUMENTS

| | | | |
|---|---|---|---|
| 5,319,513 A | 6/1994 | Lowenstein et al. | |
| 6,166,929 A | 12/2000 | Ma et al. | |
| 6,208,537 B1* | 3/2001 | Skibinski | H02M 1/12 363/40 |
| 6,269,010 B1 | 7/2001 | Ma et al. | |
| 6,366,483 B1 | 4/2002 | Ma et al. | |
| 6,525,951 B1 | 2/2003 | Paice | |
| 6,642,689 B2 | 11/2003 | Ishida et al. | |

(Continued)

FOREIGN PATENT DOCUMENTS

| | | |
|---|---|---|
| CN | 101465545 A | 6/2009 |
| CN | 201352758 Y | 11/2009 |

(Continued)

OTHER PUBLICATIONS

A Modified Direct Power Control Strategy Allowing the Connection of Three-Phase Inverters to the Grid Through LCL Filters. Serpa, et al. IEEE Transactions on Industry Applications, vol. 43, No. 5, Sep./Oct. 2007.*

(Continued)

*Primary Examiner* — Fritz M Fleming
(74) *Attorney, Agent, or Firm* — Fay Sharpe LLP

(57) ABSTRACT

Power conversion systems and methods are presented for detecting filter capacitor resonance conditions in a power conversion system in which filter currents are measured and filtered using a bandpass filter, and one or more computed mean, RMS, and/or Fourier transform values are computed based on the filtered value(s). The computed measurement value or values are compared with a predetermined threshold and a suspected filter capacitor resonance condition is selectively identified based on comparison result.

20 Claims, 10 Drawing Sheets

(56) References Cited

U.S. PATENT DOCUMENTS

| | | | |
|---|---|---|---|
| 7,274,576 | B1 | 9/2007 | Zargari et al. |
| 7,495,410 | B2 | 2/2009 | Zargari et al. |
| 7,495,938 | B2 | 2/2009 | Wu et al. |
| 7,511,976 | B2 | 3/2009 | Zargari et al. |
| 7,782,009 | B2 | 8/2010 | Wiseman |
| 8,259,426 | B2 | 9/2012 | Xiao et al. |
| 2001/0048604 | A1* | 12/2001 | Oka ................ H02M 7/219 363/44 |
| 2007/0211501 | A1 | 9/2007 | Zargari et al. |
| 2007/0297202 | A1 | 12/2007 | Zargari et al. |
| 2008/0180055 | A1 | 7/2008 | Zargari et al. |
| 2009/0128083 | A1 | 5/2009 | Zargari |
| 2010/0025995 | A1 | 2/2010 | Lang et al. |
| 2010/0080028 | A1 | 4/2010 | Cheng et al. |
| 2013/0286692 | A1* | 10/2013 | Patel ................ H02M 1/32 363/37 |

FOREIGN PATENT DOCUMENTS

| | | | |
|---|---|---|---|
| CN | 102263539 A | 11/2011 | |
| EP | 1990900 A1 * | 11/2008 | ............ H02M 1/126 |
| WO | WO 2011124223 A2 * | 10/2011 | ................ H02J 3/01 |

OTHER PUBLICATIONS

Exploring Inherent Damping Characteristic of LCL-Filters for Three-Phase Grid-Connected Voltage Source Inverters. Tang, et al. IEEE, 2010.*
Investigation of Active Damping Approaches for PI-based Current COntrol of Grid-Connected PWM Converters with LCL Filters. Dannehl et al. IEEE 2009.*
Design and Control for Three-phase Grid-connected Photovoltaic Inverter with LCL Filter. Chen et al. IEEE 2009.*
Modeling and Control of a Grid Connected VSI using a delta connected LCL Filter. Lee et al. IEEE 2008.*
First Office Action issued by the Patent Office of the People's Republic of China and Search Report, Issued Dec. 26, 2014, CN201310158458.5, 6 pgs.
Li et al., AC Electronic Load Adopting LCL-Filter Connected to the Grid, High Voltage Engineering, vol. 35, No. 10, Oct. 31, 2009, English Abstract, 8 pgs.
Second Office Action issued by the Patent Office of the People's Republic of China and Search Report, Issued Aug. 11, 2015, CN201310158458.5, 6 pgs. (English Translation Provided).

* cited by examiner

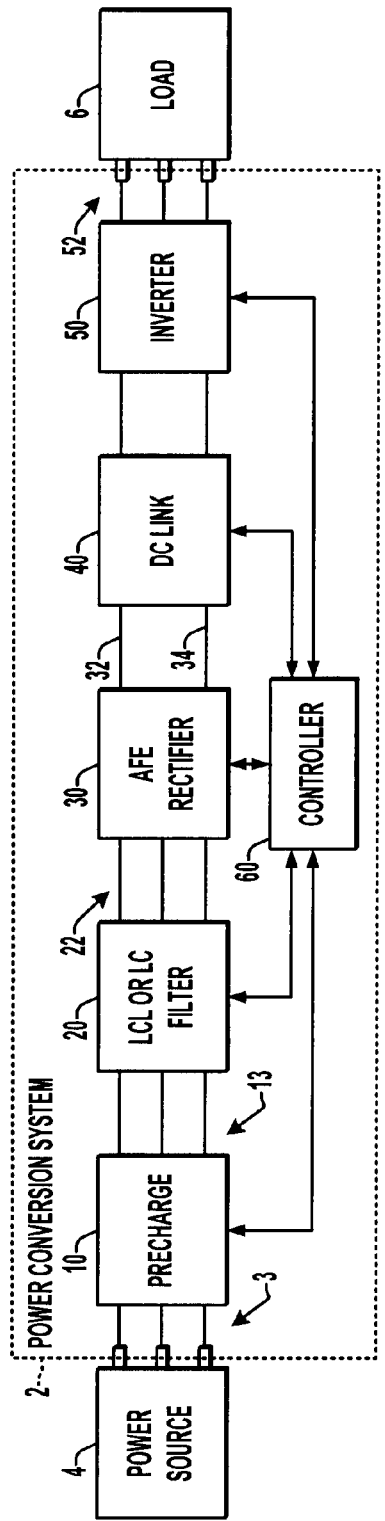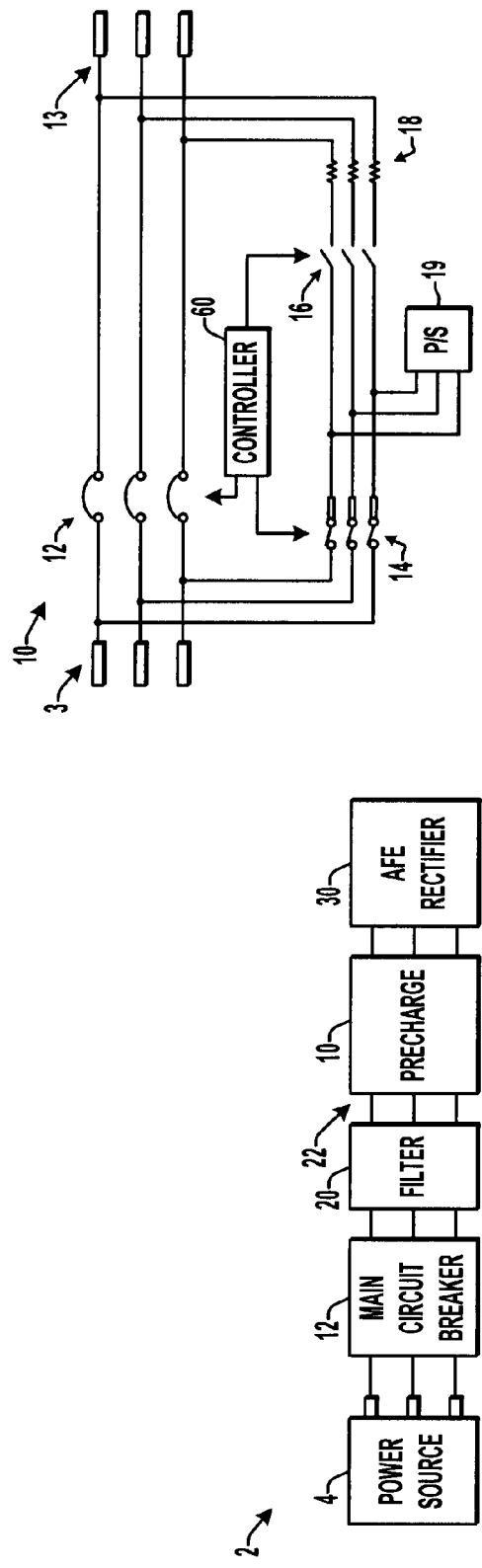

POWER CONVERTER RESONANCE DETECTION APPARATUS AND METHOD

REFERENCE TO RELATED APPLICATION

This application claims priority to and the benefit of U.S. Provisional Patent Application Ser. No. 61/640,456, filed Apr. 30, 2012, entitled DRIVE RESONANCE CONDITION REDUCTION TECHNIQUES, the entirety of which is hereby incorporated by reference.

BACKGROUND

Motor drives and other power conversion systems operate using power from AC power sources, and may include an input filter to reduce switching noise associated with operation of the power converter, particularly to control total harmonic distortion (THD) generated by high frequency operation of active front end (AFE) rectifiers. The input filter employed in these converters often includes an inductor-capacitor (LC) or an LCL (inductance-capacitance-inductance) circuit associated with each AC input phase to control the harmonic content of a power grid. LCL and LC filter circuits may interact with the power conversion circuitry under circumstances leading to resonant conditions which may damage or degrade filter circuit components and other elements of the power converter. Such degradation may be costly in terms of replacement component costs, labor for inspection and replacement, as well as downtime for the power conversion system and any associated machinery. In addition, continued operation of the converter with internal resonant conditions degrades system efficiency and may inhibit the ability to properly drive a load. Thus far, however, assessing power converter resonance has been difficult and these conditions are not easily identifiable by operators or service personnel.

SUMMARY

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts of the disclosure in a simplified form prior to the more detailed description that is presented hereinafter.

Power conversion systems and methods are presented for detecting power converter resonance conditions according to measured filter currents. A power conversion system is provided which includes a filter circuit with filter capacitors coupled between an AC input and a rectifier. A controller identifies suspected resonance conditions in the filter circuit at least partially according to components of one or more filter currents in a predetermined frequency band. In certain embodiments, the filter current is a current flowing in one or more capacitors of the filter circuit. In other embodiments, the filter circuit is an LCL or LC circuit and the controller assesses one or more line or phase currents flowing in the filter circuit. The controller in certain embodiments includes a bandpass filter with an upper cutoff frequency below a switching frequency of the rectifier, and a lower cutoff frequency above a fundamental frequency of the filter current signal or value. In certain embodiments, moreover, the controller identifies a suspected resonance condition if a mean value or RMS of the filter current components in the predetermined frequency band exceeds a predetermined threshold. In other embodiments, the controller identifies suspected resonance based on Fourier analysis of the filter current components in the predetermined frequency band.

Methods and non-transitory computer readable mediums are provided with computer executable instructions for detecting resonance in a power conversion system, including receiving or analyzing at least one filter current signal or value representing a current flowing in a filter circuit of the power conversion system, and selectively identifying a suspected resonance condition at least partially according to components in a predetermined frequency band. Certain embodiments include filtering the filter current using a bandpass filter, computing at least one mean or RMS value, and selectively identifying a suspected resonance condition in the power conversion system if the mean or RMS value exceeds a threshold.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which:

FIG. 1 is a schematic diagram illustrating a power conversion system with a controller configured to identify suspected input filter resonance conditions according to measured currents;

FIG. 1A is a schematic diagram illustrating an alternate power converter embodiment with a main circuit breaker between the AC input and the input filter circuit, as well as a precharge circuit connected between the filter output and the input of the rectifier;

FIG. 2 is a schematic diagram illustrating a precharge circuit in the power converter of FIG. 1;

DETAILED DESCRIPTION

Figures 3, 3A:
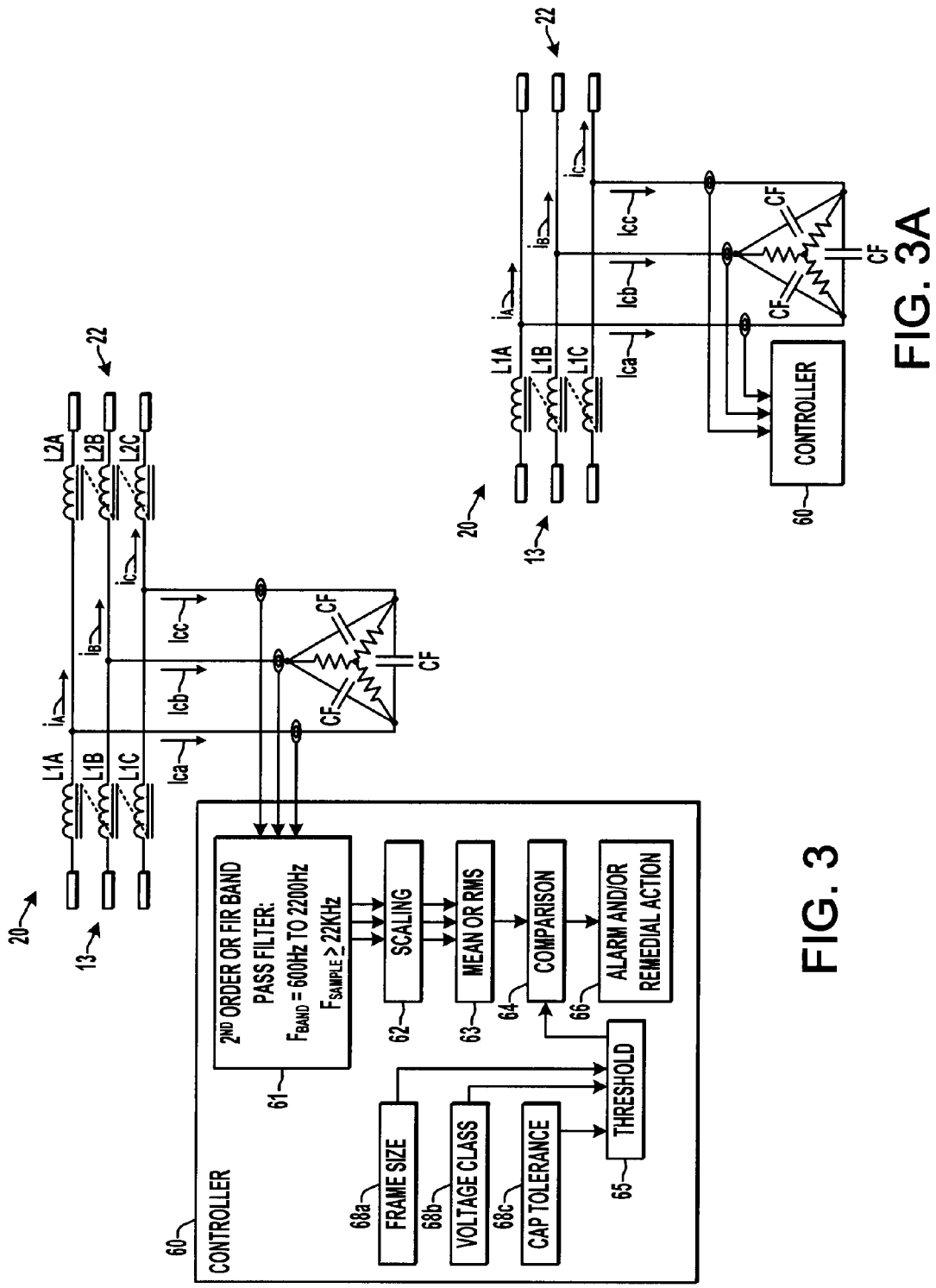
FIG. 3 is a schematic diagram illustrating a delta-connected LCL filter circuit with a controller performing a threshold comparison of bandpass filtered mean or RMS filter capacitor current values to detect converter resonance.
FIG. 3A is a schematic diagram illustrating an LC filter circuit arrangement for a current source converter embodiment including delta-connected filter capacitors.

Referring now to the figures, several embodiments or implementations are hereinafter described in conjunction with the drawings, wherein like reference numerals are used to refer to like elements throughout, and wherein the various features are not necessarily drawn to scale.

FIG. 1 illustrates a power conversion system 2 including a precharge circuit 10, an LCL or LC input filter circuit 20, an active front end (AFE) rectifier 30, a DC link circuit 40, an inverter 50, and a controller 60 which detects resonance conditions at least partially according to harmonic content of one or more converter currents in a predetermined frequency band. The power conversion system 2 has an AC input 3 coupleable to receive multiphase AC input power from a power source 4 and a single or multiphase AC inverter output 52 providing AC output power to a single or multiphase load 6, such as a motor.

Figure 7:
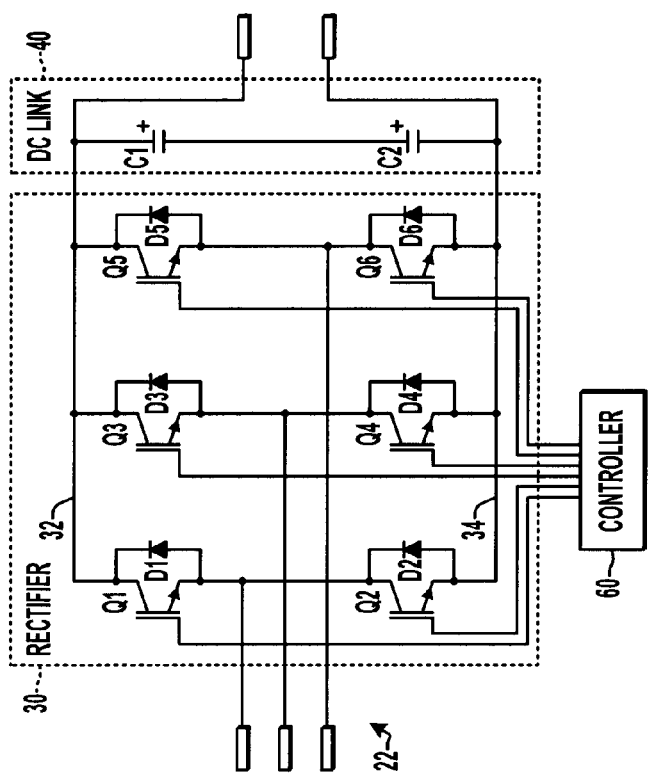
FIG. 7 is a schematic diagram illustrating an active front end (AFE) rectifier and a DC link in the power conversion system of FIG. 1.

In certain embodiments, the power conversion system is a current source converter (CSC) system having an LC filter circuit 20 and a DC link 40 with one or more inductances (e.g., such as a DC link choke) to accommodate DC link current provided by the rectifier 30 and used as input power by the inverter 50. In other embodiments described herein, the converter 2 is a voltage source converter (VSC) with an LCL filter circuit 20, in which the DC link circuit 40 includes one or more DC link capacitances (e.g., C1 and C2 as seen in FIG. 7 below).

The power source 4 provides multiphase AC input power, where the illustrated examples show a three-phase implementation, although other multiphase implementations are possible having three or more input phases. The inverter 50 can provide a single phase or multiphase output 52, with the illustrated examples showing a three-phase inverter 50 driving a three-phase load 6 (e.g., a motor). The converter 2, moreover, can be a motor drive although any form of power conversion system 2 may be implemented according to the present disclosure, whether driving a motor or a different form of single or multiphase AC load 6 or a DC load (not shown) in which case the inverter 50 may be omitted.

The controller 60 can be implemented as any hardware, processor-executed software, processor-executed firmware, programmable logic and/or combinations thereof to implement the resonance detection functionality set forth herein including other functions associated with operation of the power conversion system 2. In certain embodiments, the controller 60 may be implemented as a single processor-based circuit and/or may be implemented using multiple processor elements. For instance, certain resonance detection functions set forth herein may be implemented in a local controller 60, such as a field programmable gate array (FPGA) implemented in the LCL or LC input filter circuit 20, and/or such features may be implemented using a centralized controller 60 in certain embodiments or in multiple controller elements 60. For instance, a localized controller 60 may be implemented on or in association with the LCL or LC filter circuit 20, which receives one or more comparison threshold values from a central controller board 60. In yet other possible implementations, hardware circuits may be used to implement one or more of the resonance detection features, alone or in combination with one or more processor components.

As seen in FIG. 2, the precharge circuit 10 includes a main circuit breaker 12, a fused disconnect apparatus 14, a precharge contactor 16 and precharge resistors 18, and is operable in one of three modes. The precharge circuit 10 may be omitted in certain embodiments. As seen in FIG. 1A, alternate power converter embodiments can provide the main circuit breaker 12 between the AC input 3 and the input filter circuit 20, with a precharge circuit 10 having a precharge contactor 16 and precharge resistors 18 connected between the filter output 22 and the input of the rectifier 30.

The precharge circuitry 10 in FIG. 2 is operated by the controller 60, which typically maintains the contacts of the fused disconnect 14 in a closed condition and opens these only upon occurrence of an excess current condition. In a normal operating mode, the controller 60 (e.g., a central controller or a local precharge I/O board or precharge controller) maintains the main circuit breaker 12 in the closed position to allow input power to flow from the power source 4 to precharge output terminals 13, but maintains the precharge contactor 16 in an "open" (e.g., nonconductive) condition, whereby no current flows through the pre-charge resistors 18. In a "precharge" mode (e.g., at startup or controlled reset of the power conversion system 2), the controller 60 switches the main circuit breaker 12 into the "open" condition and closes the precharge contactor 16, to allow current to flow from the AC source 4 through the precharge resistors 18 to the precharge output terminals 13. This effectively inserts the precharge resistors 18 into the multiphase power circuitry during the "precharge" mode to control excessive current spikes to charge the capacitance of a DC bus in the DC link circuit 40 at the output of the rectifier 30 and/or at the input of the inverter 50 (e.g., capacitors C1 and C2 in the example of FIG. 7 below). The controller 60 may be provided with one or more feedback signals by which a DC link voltage can be monitored, and once the DC voltage exceeds a predetermined value, the controller 60 closes the main breaker 12 and opens the precharge contactor 16 to enter the normal mode of operation. The precharge circuitry 10 can also be operated in a "standby" mode, in which the controller 60 maintains both the main circuit breaker 12 and the precharge contactor 16 in the "open" condition, with auxiliary power being provided to various control circuits by a power supply 19 (FIG. 2). In certain embodiments, moreover, the precharge circuit 10 is operable by the controller 60 to selectively open both the main circuit breaker 12 and the precharge contactor 16 in response to indication of suspected converter resonance conditions as described further below.

As seen in FIG. 1A, in other possible embodiments, the precharge circuit 10 may be located between filter circuit 20 and the rectifier 30. In certain implementations, a main circuit breaker 12 may be connected between the AC input 3 and the filter circuit 20 to facilitate turning the power off, and the precharge circuit 10 will include a precharge contactor 16 and precharge resistors 18 connected in a bypass circuit around a precharge breaker, such as breaker 12 shown in FIG. 2.

Referring also to FIGS. 3-6, the precharge circuit outputs 13 are connected to an LCL input filter circuit 20 for VSC embodiments or to an LC filter circuit 20 for CSC embodiments. In certain embodiments, the precharge circuitry 10 may be omitted, and the LCL or LC filter circuit 20 is directly or indirectly coupled with the power converter AC input terminals 3. The filter circuit 20 includes an LCL or LC circuit for each input phase, including a first inductor L1 (e.g., L1A, L1B and L1C) and the LCL filter 20 embodiments include a second inductor L2 (L2A, L2B and L2C) with L1 and L2 being coupled in series with one another between the corresponding precharge circuit output 13 (or the corresponding AC input terminal 3) and a corresponding phase output 22 of the filter circuit 20. A plurality of filter capacitors CF are provided, with at least one of the filter capacitors CF being connected to each of the phase lines at a center node between the corresponding first and second inductors L1 and L2 (or following the inductor L1 for the LC filter embodiments).

Figure 4:
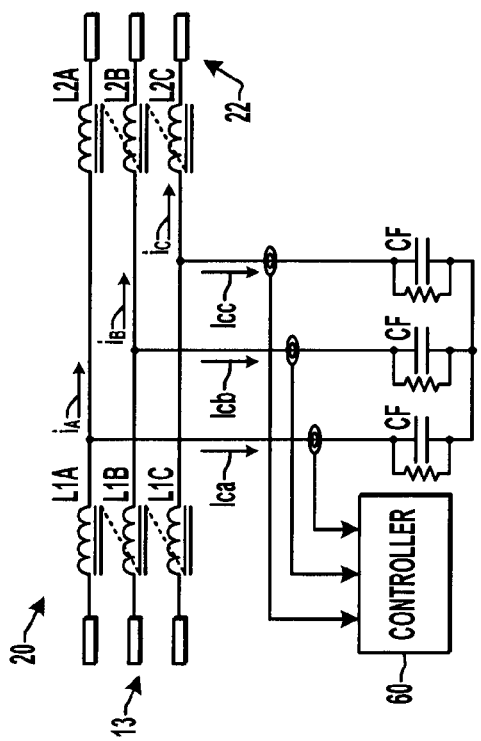
FIG. 4 is a schematic diagram illustrating another LCL filter circuit having Y-connected filter capacitors connected between individual converter phases and a common node.
Figure 5:
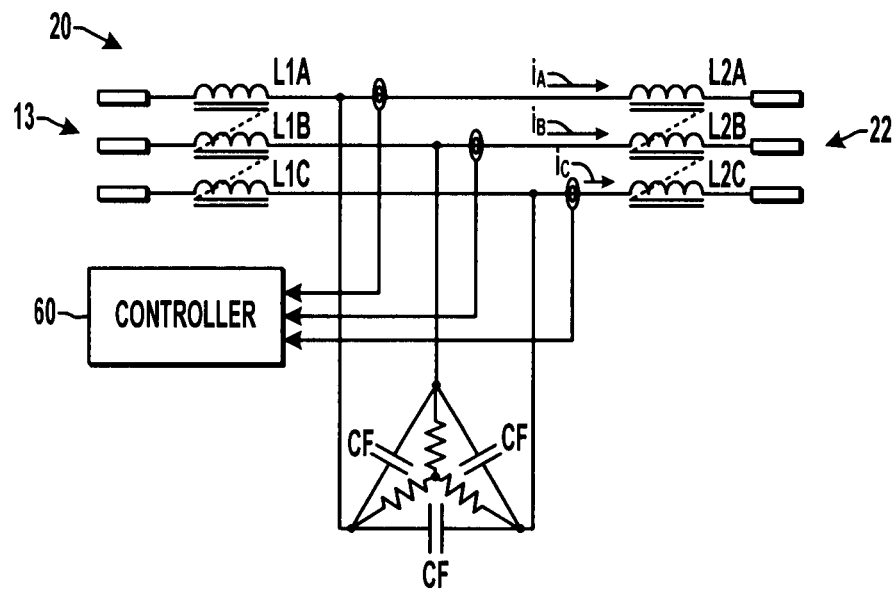
FIG. 5 is a schematic diagram illustrating another delta-connected LCL filter circuit with the controller performing a threshold comparison of bandpass filtered mean or RMS line currents for converter resonance detection.
Figure 6:
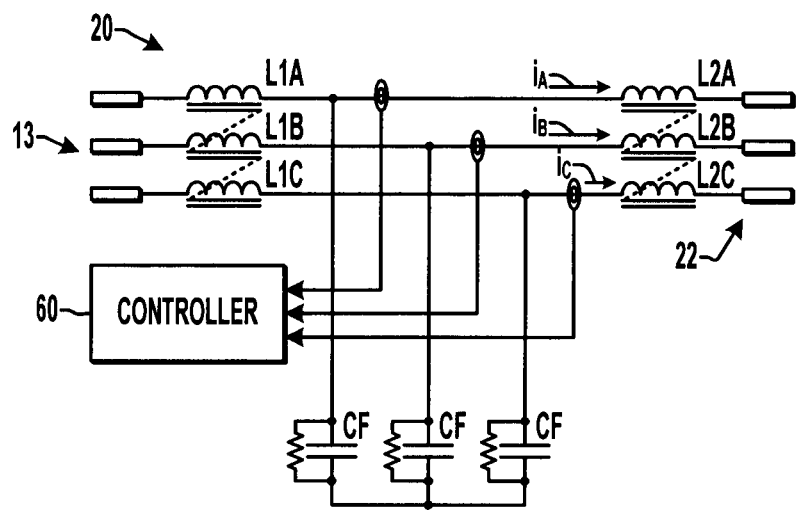
FIG. 6 is a schematic diagram illustrating another Y-connected LCL filter with a controller measuring line currents for detecting converter resonance conditions.

In the examples of FIGS. 3 and 5, the filter capacitors CF are connected in a delta configuration with a first capacitor CF connected between phases A and B, a second capacitor CF connected between phases B and C, and a third filter capacitor CF connected between phases C and A. Discharge resistors may be provided in certain embodiments as shown in FIGS. 3 and 5, with each discharge resistor being connected between a corresponding one of the power phases and an internal node. FIGS. 4 and 6 illustrate other embodiments in which the filter capacitors CF and corresponding parallel-connected discharge resistors are connected in a "Y" configuration, with each filter capacitor CF being connected between a corresponding one of the power phases and a common node, which in turn may be connected to a system ground, a neutral of the input power source 4, or which may be only connected to the filter capacitors CF in various embodiments.

The controller 60 in certain embodiments is operatively coupled with current sensors connected so as to measure one or more filter capacitor currents (Ica, Icb and/or Icc) flowing through the filter capacitors CF for selective determination of suspected resonance conditions in the power conversion system 2 generally and/or resonance conditions in the filter circuit 20. Alternatively or in combination, the controller 60 may be coupled to sensors as shown in FIGS. 5 and 6 for measurement or sensing of line or phase currents $i_A$, $i_B$ and/or $i_C$ flowing through the filter 20 in order to detect such resonance conditions.

Figure 4A:
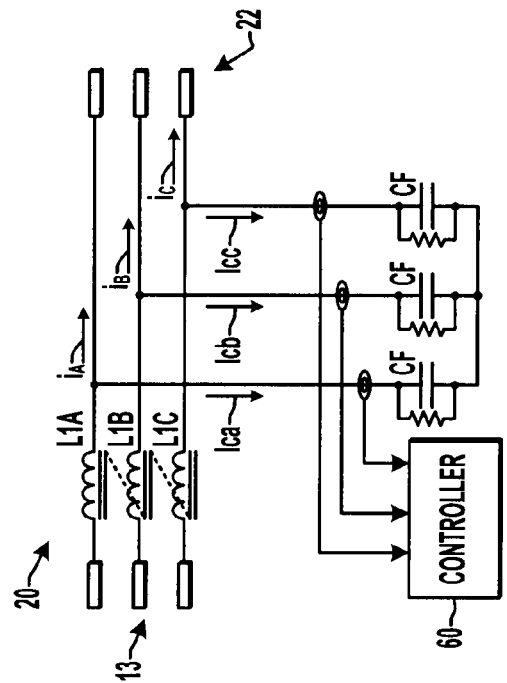
FIG. 4A is a schematic diagram illustrating an LC filter circuit arrangement for a current source converter embodiment including Y-connected filter capacitors.

As seen in FIGS. 3A and 4A, current source converter embodiments can include an LC filter with a plurality of filter capacitors CF connected downstream of corresponding inductors L1A, L1B and L1C in the corresponding power phases between the filter capacitor connection points and the AC input 3. In these embodiments, moreover, discharge resistors may be connected in parallel with each of the filter capacitors CF as shown, or such discharge resistors may be omitted in other embodiments. FIG. 3A illustrates a current source converter embodiment of the filter circuit 20 in which the filter capacitors CF are connected in a delta configuration with discharge resistors connected between the corresponding filter capacitor connections and a central node. FIG. 4A illustrates another embodiment of an LC filter circuit 20 for a current source converter system 2 in which the filter capacitors CF are connected in a Y-configuration along with parallel-connected discharge resistors.

FIG. 7 illustrates an active front end (AFE) rectifier circuit 30 in the power conversion system of FIG. 1, as well as a DC link circuit 40. In the illustrated example, the rectifier 30 includes switching devices Q1-Q6, such as insulated gate bipolar transistors (IGBTs) or other electrical switching devices. Q1-Q6 are individually operable according to a corresponding rectifier switching control signal from the controller 60 to selectively couple a corresponding one of the phase lines A, B and C to one of two DC circuit nodes 32 or 34 to rectify input AC power to provide DC power to the DC link 40, where the controller 60 may provide the switching control signals according to any suitable switching scheme such as pulse width modulation (PWM). The rectifier 30 may alternatively or in combination provide passive rectifier diodes D1-D6 individually coupled between one of the AC nodes 22 at the filter circuit output and a corresponding one of the DC nodes 32, 34 for passive rectification of AC input power to establish the DC link 40. Certain embodiments of the rectifier 30 may provide regenerative operation (with or without the passive rectifier diodes D1-D6 rectifying input power to charge the capacitors C1, C2 of the DC link circuit 40) in which the controller 60 selectively actuates the rectifier switches Q1-Q6 via pulse width modulation or other suitable switching technique for selective connection of the DC nodes 32, 34 with the input nodes 22 to allow conduction of regenerative current from the DC link 40 back towards the power source 4.

The DC link circuit 40 includes one or more capacitances coupled between the DC circuit nodes 32 and 34 for voltage source converter implementations, where FIG. 7 illustrates one embodiment in which two capacitances C1 and C2 are connected in series with one another between the nodes 32 and 34. The DC link capacitance may be constructed using any suitable number of capacitor devices connected in any suitable series, parallel or series/parallel configurations to provide a capacitance connected between the DC nodes 32 and 34. Current source converter embodiments are possible in which the DC link circuit 40 includes one or more inductances (not shown) and the filter 20 for such CSC implementations can be an LC circuit as shown in FIGS. 3A and 4A above.

Figure 8:
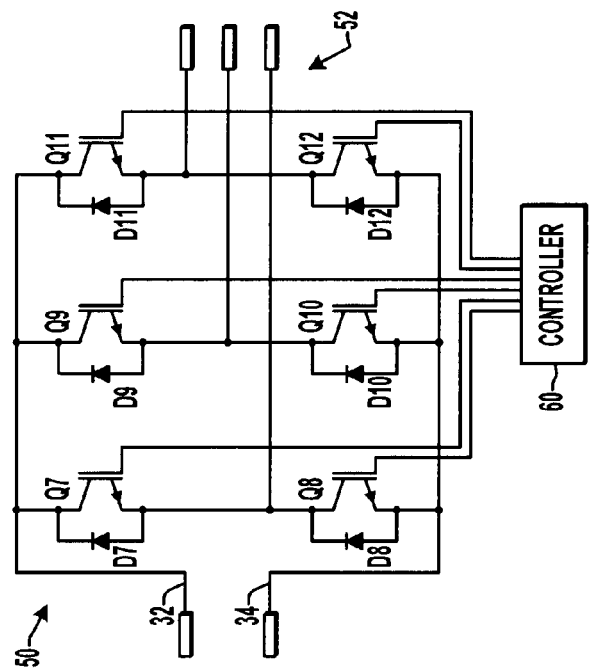
FIG. 8 is a schematic diagram illustrating a three-phase inverter in the power conversion system of FIG. 1.

FIG. 8 illustrates an inverter circuit 50 including inverter switching devices Q7-Q12 and corresponding parallel-connected rectifier diodes D7-D12, where the controller 60 provides inverter switching control signals to the devices Q7-Q12 in order to selectively couple a corresponding DC terminal 32, 34 with a corresponding one of the AC outputs 52 so as to convert DC link power to provide AC output power to drive the load 6 in a controlled manner. The controller 60 can provide the inverter switching control signals according to any suitable pulse width modulation or other switching technique in order to provide AC output power to drive the load 6, which can be accomplished according to any suitable control technique, for instance, to regulate output frequency, output power, motor speed control, motor torque control, etc. or combinations thereof.

Certain embodiments of the controller 60 include at least one processor (e.g., a microprocessor, microcontroller, field programmable gate array, programmable logic, etc.) programmed or otherwise configured to identify one or more suspected resonance conditions based at least in part on the filter capacitor currents Ic flowing in the filter capacitors CF (Ica, Icb and Icc in the three-phase examples of FIGS. 3 and 4) and/or in the line currents $i_A$, $i_B$, $i_C$ (FIGS. 5 and 6). In certain embodiments, the controller 60 implements the resonance detection functionality using one or more processors of a general power conversion system controller. In other embodiments, one or more of these functions is performed by a FPGA or other processor local to the LCL filter circuit 20, which may, but need not, receive one or more threshold values TH from a central control board or main controller of the power conversion system 2. In other embodiments, hardware circuitry can be used alone or in combination with one or more processor components to implement the resonance detection functions.

As noted above, the filter capacitors CF can be connected in a delta configuration (e.g., FIGS. 3 and 5, alone or with optional discharge resistors as shown) or may be connected in a Y-configuration (e.g., FIGS. 4 and 6). The controller 60 in FIGS. 3 and 4 is provided with signals or values indicating the levels of the filter capacitor currents Ica, Icb and Icc by any suitable means, such as by current sensors in the lines connecting the filter capacitors CF to the phase lines A, B and C. In this regard, the capacitor currents Ica, Icb and Icc in the delta-connected filter capacitor configuration of FIG. 3 can be sensed or measured using sensors configured in the lines connecting the delta configuration to the phase lines A, B and C as shown, or sensors can be connected in series with each of the individual delta-connected capacitors CF in other embodiments. It is noted that these filter capacitor currents Ica, Icb and Icc will be typically less than the phase currents $i_A$, $i_B$ and $i_C$ flowing between the filter circuit inputs and outputs 22 which can be used alternatively or in combination for the described resonance detection concepts. In the example of FIG. 4, current sensors are provided in series with each of the filter capacitor CF in order to measure the corresponding filter capacitor current by virtue of the Y-connection. In the embodiments of FIGS. 5 and 6, the controller 60 is provided with signals or values indicating the levels of the line currents $i_A$, $i_B$, $i_C$ for the situations in which the filter capacitors CF are connected in a delta configuration (FIG. 5) or in a Y-configuration (FIG. 6). Moreover, in certain embodiments, the controller 60 may also be provided with signals or values indicating the AC voltages in the filter circuit, such as line-line voltages (e.g., $V_{AB}$, $V_{BC}$ and $V_{CA}$) and/or line-neutral voltages ($V_A$, $V_B$ and $V_C$) by suitable sensors or other means (not shown).

As best seen in FIG. 3, certain embodiments of the controller 60 include a bandpass filter 61 which receives one or more current signals or values representing filter capacitor currents and/or line (phase) currents in the filter circuit 20 (e.g., Ica, Icb, Icc, $i_A$, $i_B$ and/or $i_C$). The current signal(s) or value(s) can be received directly from sensors as shown in FIGS. 3-6 and/or may be received from other components of the power conversion system 2. Based at least partially on one or more current signals or values, the controller 60 identifies suspected resonance conditions in the filter circuit 20 and/or in the power conversion system 2 generally. In particular, the controller assesses components of at least one current (e.g., Ica, Icb, Icc, $i_A$, $i_B$ and/or $i_C$) in a predetermined frequency band, such as about 500 Hz to about 2200 Hz in one possible implementation. In the embodiment of FIG. 3, the controller 60 employs a second-order or FIR (Finite Impulse Response) bandpass filter 61 to provide filtered output signals or values representing the predetermined frequency band components of the sensed current(s).

The bandpass filter 61 in certain embodiments determines components of at least one filter current signal or value (e.g., Ica, Icb, Icc, $i_A$, $i_B$, and/or $i_C$) in a predetermined frequency band (e.g., 500-2200 Hz in one embodiment, 600-2200 Hz in another possible embodiment). The filter 61 may be any suitable form of analog and/or digital bandpass filter having upper and lower cutoff frequencies. In certain embodiments, the lower cutoff frequency is about 500 Hz or more and the upper cutoff frequency is about 2200 Hz or less. In further embodiments, the lower cutoff frequency may be about 600 Hz or more. In certain embodiments, moreover, the lower cutoff frequency is above a fundamental frequency of the filter current signals or values (e.g., the fundamental frequency of currents Ica, Icb, Icc, $i_A$, $i_B$ and/or $i_C$ flowing in the filter circuit 20). In some embodiments, moreover, the upper cutoff frequency of the filter 61 is below a switching frequency of the active front end rectifier 30. For instance, certain embodiments of the rectifier 30 may perform active rectification and/or regenerative switching of the devices Q1-Q6 at a switching frequency of about 4 kHz, where the exemplary filter 61 provides an upper cutoff frequency of about 2200 Hz or less. In addition, certain embodiments of the controller 60 provide for sampling the one or more filter current signals or values at a sample rate or sample frequency $F_{SAMPLE}$ of about 22 kHz or more.

The controller 60 in FIG. 3 further includes a scaling component 62 (e.g., analog and/or digital implementations are possible) to scale the filtered signals from the bandpass filter 61 according to any suitable scaling coefficients or values. As mentioned, the controller 60 may be implemented using analog hardware circuitry, digital hardware circuitry, one or more programmable processing elements such as microprocessors, microcontrollers, programmable logic, etc., and/or combinations thereof. In certain embodiments, one, some or all of the illustrated controller components 61-65, 67 and 68a-68c in FIG. 3 can be implemented in hardware and/or as processor-executed components. In the illustrated implementation, one or more of the sensed filter current values Ica, Icb, Icc, $i_A$, $i_B$ and/or $i_C$ are filtered using a bandpass filter component 61 of the controller 60. The filtered signal or signals in certain embodiments are provided to the scaling component 62 with which the filtered signals or values are scaled according to any necessary scaling based on the calibration of the current sensor(s), the gain of the bandpass filter circuit 61, the scaling associated with the threshold value 65, etc. In other embodiments, the scaling component 62 may be omitted.

The controller 60 in certain embodiments uses the filtered signals or values (with or without subsequent scaling) to compute one or more mean or RMS values via a computation component 63 (which can be processor-implemented or which may be analog and/or digital hardware circuitry in certain embodiments). A comparison component 64 selectively provides an alarm and/or initiates one or more remedial actions 66 if the RMS or mean value(s) exceeds a threshold 65. In this manner, the controller 60 identifies one or more suspected resonance conditions in the converter 2 and/or in the filter circuit 20 thereof if at least one mean value or RMS value of the components of at least one filter current signal or value in the predetermined frequency band exceeds the predetermined threshold 65. This resonance detection concept, moreover, can be used with one or more of the filter capacitor current signals or values Ica, Icb, Icc representing current flowing in one or more of the filter capacitors CF and/or these concepts may be employed using one or more of the line or phase current signals or values $i_A$, $i_B$ and/or $i_C$.

Any suitable threshold value or values 65 can be employed by which resonance of a certain magnitude of interest can be detected. In certain embodiments, moreover, the threshold 65 is determined at least in part according to a power conversion system frame size 68a, a power converter voltage class 68b and/or one or more tolerance values 68c associated with the filter capacitors CF. In hardware implementations, the threshold 65 can be provided as one or more signals, and/or the threshold 65 can be one or more values in programmable processor implementations. In certain embodiments, the threshold 65 can be a predetermined value, and the controller 60 in certain embodiments selectively adjusts the threshold 65 based on one or more measured conditions in the power conversion system 2. In certain embodiments, moreover, the threshold 65 can be provided by a main control board of the power conversion system 2 to a local controller 60 implementing the resonance detection functions described herein, such as a local controller 60 operatively associated with the filter circuit 20. The controller 60 may also be provisioned with frame size information 68a, such as a rating associated with the power conversion system 2, a voltage class indicator or value 68b associated with the power converter 2 and/or capacitor tolerance data, value(s) or information 68c indicating one or more tolerance values (e.g., maximum rated current values, etc.) associated with the filter capacitors CF.

Figure 9:
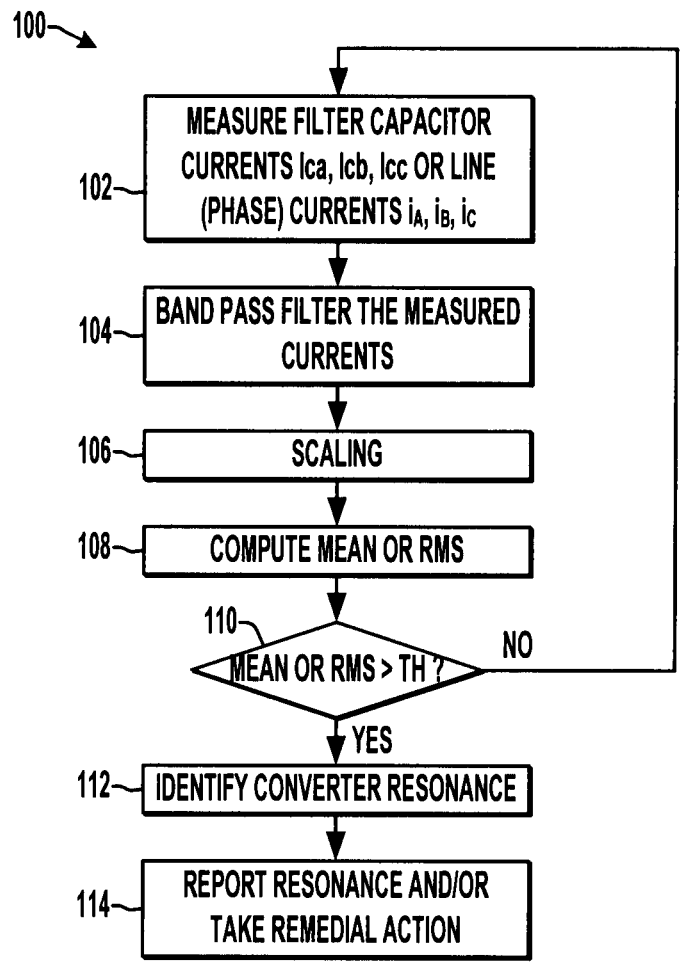
FIG. 9 is a flow diagram illustrating a method of identifying a suspected resonance condition in a power conversion system using measured current values and mean or RMS computations.
Figure 10:
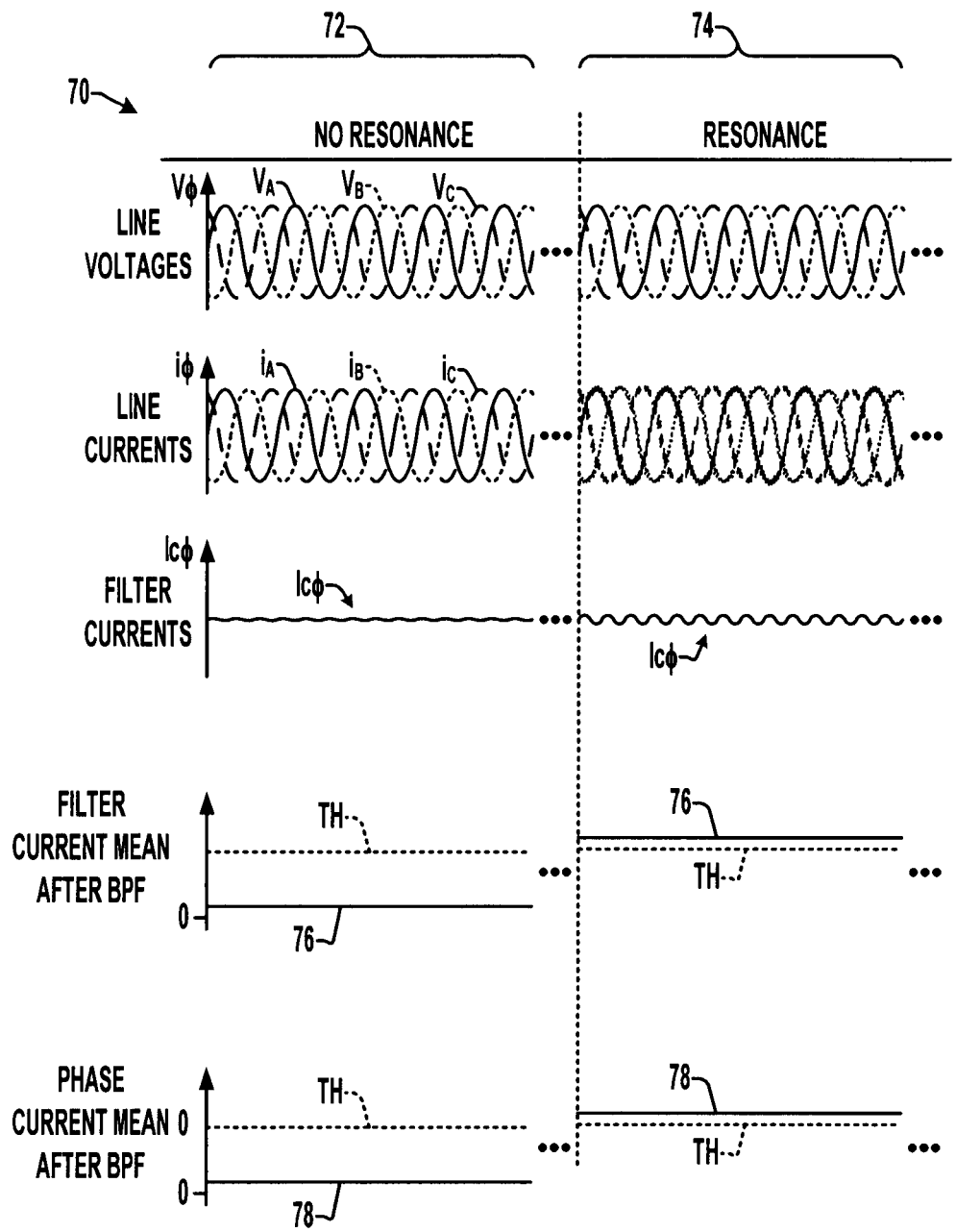
FIG. 10 is a graph showing three-phase AC voltages, line currents, filter currents, and computed mean values with corresponding threshold comparisons for conditions with and without converter resonance.

Referring now to FIGS. 3, 9 and 10, FIG. 9 illustrates an exemplary process 100 for detecting resonance in the power conversion system 2 and FIG. 10 illustrates a graph 70 showing various signals in the power converter 2 during operation with no resonance (indicated at 72 in FIG. 10) as well as operation with internal resonant conditions (74 in FIG. 10). In this regard, one resonant condition of interest is resonance in the filter circuit 20, although the process 100 can being employed for detecting resonance in the power conversion system 2 generally. Although the exemplary method 100 of FIG. 9 and the method 200 of FIG. 11 below are hereinafter illustrated and described in the form of a series of acts or events, the various methods of the present disclosure are not limited by the illustrated ordering of such acts or events except as specifically set forth herein. In this regard, except as specifically provided in the claims, some acts or events may occur in different order and/or concurrently with other acts or events apart from those acts or events and ordering illustrated and described herein, and not all illustrated acts or events may be required to implement a process or method in accordance with the present disclosure. The disclosed methods, moreover, may be implemented in hardware, processor-executed software, programmable logic, etc., or combinations thereof, in order to provide the described functionality, wherein these methods can be practiced in the above described power conversion system 2, such as in the controller 60, although the presently disclosed methods are not limited to the specific applications and implementations illustrated and described herein. Moreover, the methods 100 and 200 may be embodied as a computer executable instructions stored on a non-transitory computer readable medium, such as a memory operatively associated with the controller 60 and/or with the power conversion system 2.

The method 100 of FIG. 9 facilitates identification of suspected resonance in the converter 2 and/or in the included filter circuit 20 by threshold comparison of mean or RMS computation of harmonic components of one or more line or filter capacitor currents. At 102, one or more of these signals or values (e.g., Ica, Icb, Icc, $i_A$, $i_B$ and/or $i_C$) are measured or otherwise received or obtained, and are analyzed to selectively identify a suspected resonance condition based at least partially on components thereof which are in a predetermined frequency band (e.g., 500-2200 Hz in one embodiment, 600-2200 Hz in another illustrative embodiment). The harmonic components of interest may be obtained by bandpass filtering the filter current signal(s) or value(s) at 104 using a bandpass filter (e.g., filter component 61 in FIG. 3 above) with lower and upper cutoff frequencies defining the predetermined frequency band. At 106, the filtered signal(s) or value(s) may be scaled in certain embodiments, and one or more mean and/or RMS values are computed at 108. The mean or RMS computation at 108 may be performed using any suitable numeric techniques as are known, and can be accomplished using any suitable analog circuitry, digital circuitry, processor-executed firmware or processor-executed software, etc.

A determination is made at 110 in FIG. 9 as to whether the computed mean or RMS value(s) exceeds a threshold TH (e.g., threshold 65 in FIG. 3). If not (NO at 110), the process 100 repeats, returning to 102-108 as described above. If the threshold value is exceeded (YES at 110), the controller 60 identifies or otherwise determines at 112 that resonance in the converter 2 is suspected. In this embodiment, the controller 60 may optionally report the suspected resonance condition and/or take one or more remedial actions at 114. For instance, the controller may open the main circuit breaker 12 and the precharge contactor 16 in the precharge circuitry 10 of FIG. 2 above and/or may initiate other controlled shutdown and reporting operations, such as setting an alarm, indicating a suspected resonance condition on a user interface of the power conversion system 2, sending an error message to a supervisory controller associated with the power converter 2, etc. In addition, or separately, the controller 60 may log a fault and reset the power converter 2, such as by storing a value to a fault log in a nonvolatile memory of the power converter 2 (not shown), or the controller 60 may indicate a non-resettable fault to a human machine interface (HMI, not shown) for different levels of suspected resonance (e.g., as indicated by the relative comparison with the threshold 65), and/or may only allow a fault to be reset upon password-protected input by service personnel after system inspection.

FIG. 10 illustrates exemplary line voltages (phase voltages Vφ including $V_A$, $V_B$ and $V_C$ in the illustrated three-phase embodiment), line currents iφ (e.g., $i_A$, $i_B$, $i_C$), and filter capacitor currents Icφ (e.g., Ica, Icb and/or Icc) along with bandpass filtered mean signals or values in the power conversion system 2 for normal (e.g., no resonance) conditions at 72 and during resonance at 74. The inventors have appreciated that the line currents $i_A$, $i_B$ and/or $i_C$ will have a detectable harmonic component within the predetermined frequency band (e.g., above the power source fundamental frequency and below the rectifier switching frequency, such as between about 500 and 2200 Hz) when the power converter 2 is in the resonance condition 74. In addition, the inventors have appreciated that the filter capacitor currents Ica, Icb and/or Icc (Iφ) will have a comparatively higher harmonic component in this predetermined frequency band for system resonance 74 than for normal (no resonance) operation at 72, as seen in FIG. 10. In this regard, absent system resonance, the line currents iφ are normally clean sinusoids at the fundamental power source frequency (e.g., 50 or 60 Hz), and filter capacitor currents Icφ normally include a small harmonic component.

During resonance, however, harmonics in the predetermined frequency band appear in the line currents iφ and the amplitude of the harmonics and the filter currents Icφ increase. Accordingly the mean or RMS value(s) 76 associated with the filter current in the predetermined frequency band or the mean or RMS value(s) 78 associated with the phase current components in the predetermined frequency band are seen to increase during the resonant condition 74 in FIG. 10. Accordingly, the controller 60 compares one or more of these values 76, 78 with a corresponding threshold value TH (e.g., threshold 65 in FIG. 3) and selectively identifies a suspected resonance condition when the value 76, 78 exceeds the threshold TH (e.g., YES at 110 in FIG. 9). As seen in FIG. 10, the controller 60 advantageously provides the threshold 65 at a level TH slightly above the normal operating level of the mean or RMS value 76, 78 of the sensed filter current(s) to detect the onset of suspected resonance conditions and may accordingly initiate an alarm and/or other remedial action via component 66. Moreover, the threshold 65 may be tailored according to a specific frame size 68a, voltage class 68b and/or one or more filter capacitor specifications 68c.

Figure 11:
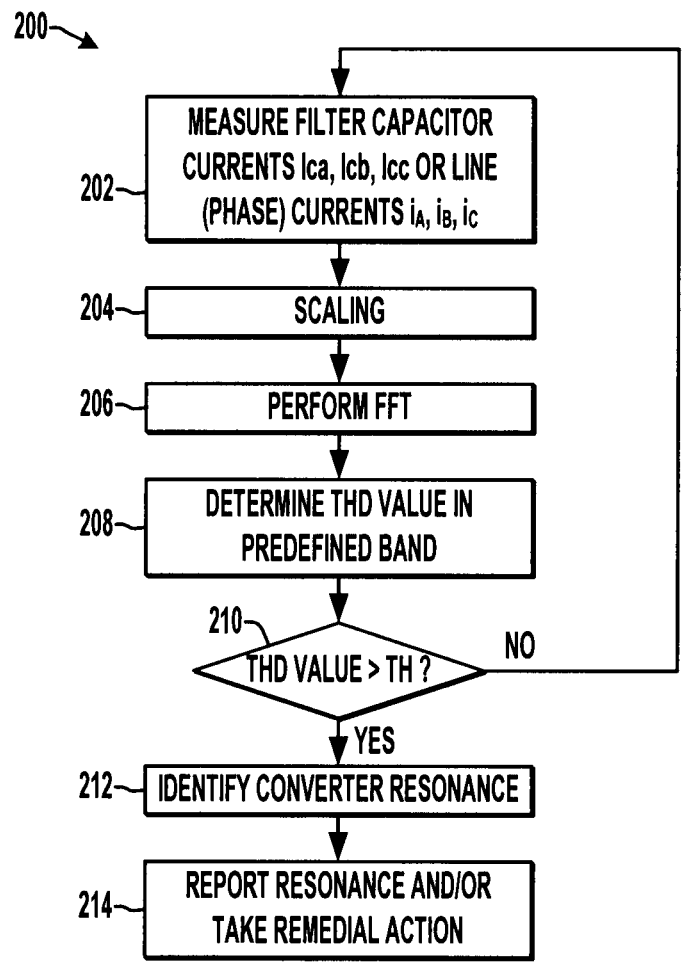
FIG. 11 is a flow diagram illustrating another method of identifying suspected power conversion system resonance using Fourier transform techniques and measured filter currents.

Referring now to FIGS. 3 and 11-15, in other embodiments, the controller 60 may include circuitry and/or processor-executed instructions for performing Fourier analysis, such as Fast Fourier Transform (FFT) components, to analyze one or more components of filter current signal(s) and/or value(s) for selective identification of suspected resonance conditions in the converter 2 and/or the filter circuit 20 thereof. FIG. 11 illustrates an exemplary resonance condition detection method 200 in which the controller 60 measures or otherwise receives and analyzes one or more filter capacitor currents (e.g., Ica, Icb and/or Icc) and/or line currents (e.g., $i_A$, $i_B$, $i_C$) at 202 and may optionally bandpass filter the current value(s) and scaling can be performed at 204 according to any suitable scaling technique. Fourier analysis is performed at 206 and a total harmonic distortion (THD) value in a predefined frequency band is determined at 208. This THD value is compared with a threshold TH at 210. If the THD value exceeds the threshold (YES at 210), converter resonance is identified at 212 and the controller 60 may report the resonant condition and/or take remedial action at 214. Otherwise (NO at 210), the process repeats at 202-208 as described above.

Figure 12:
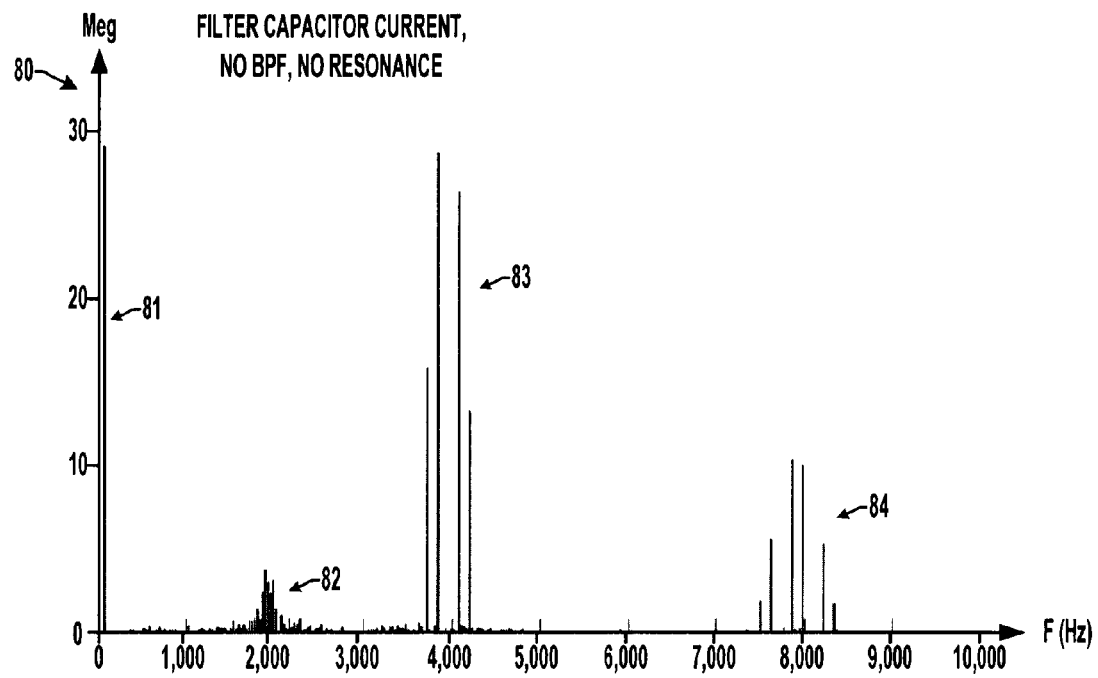
FIGS. 12-15 are graphs illustrating Fourier transforms of filter capacitor currents with and without bandpass filtering for conditions with and without power converter resonance.
Figure 13:
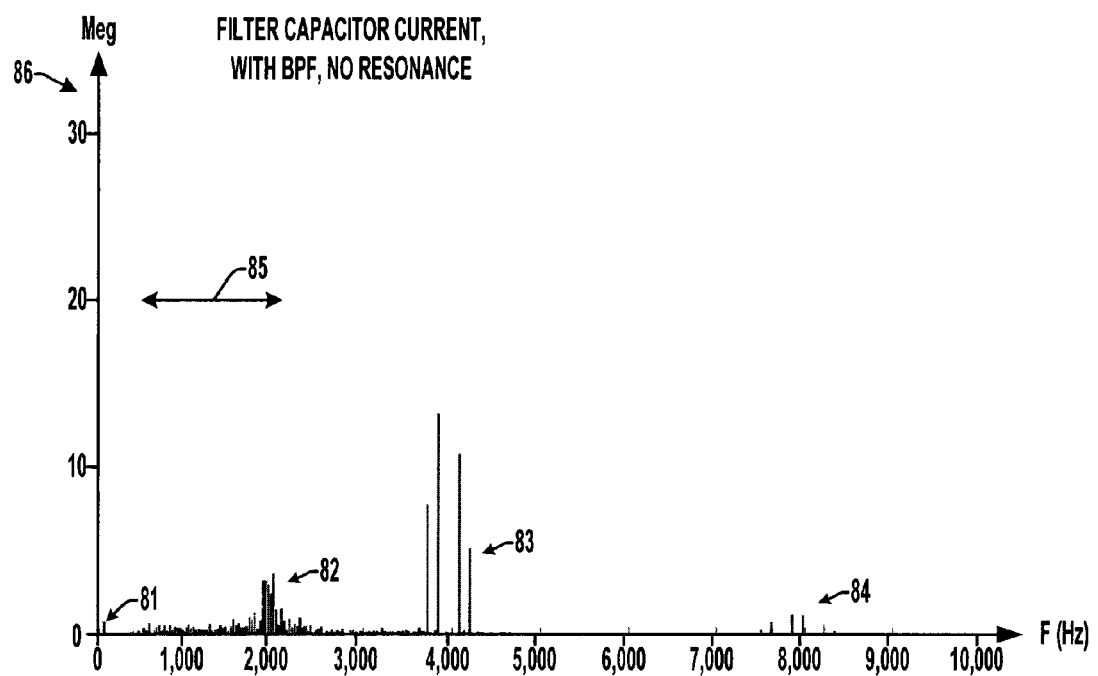
Figure 14:
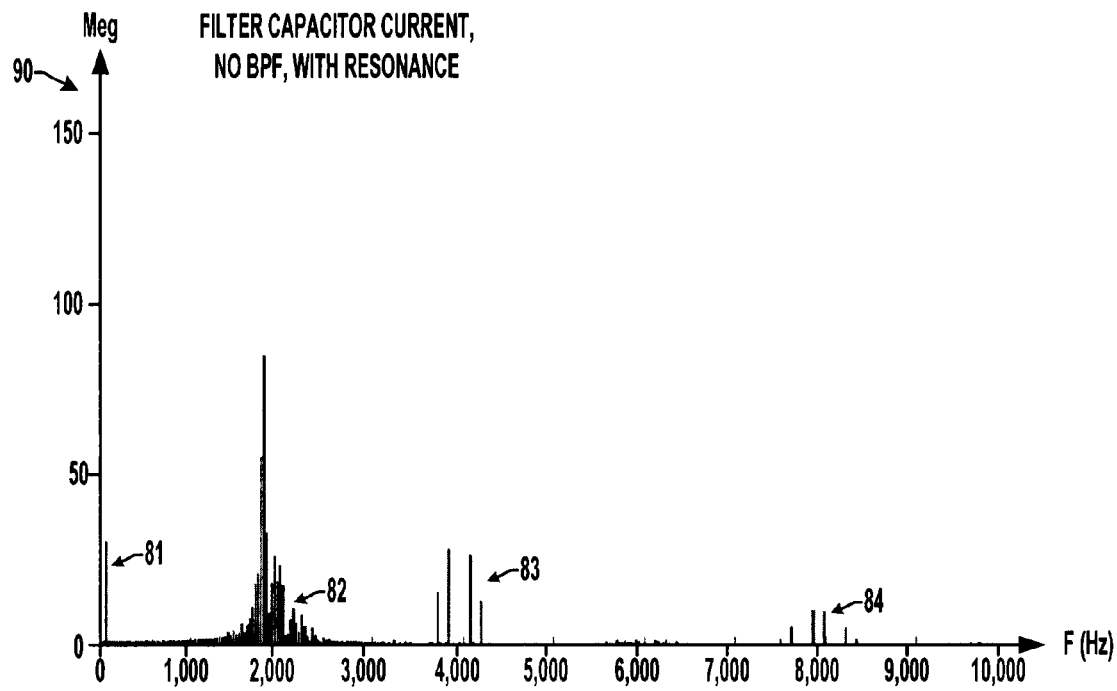
Figure 15:
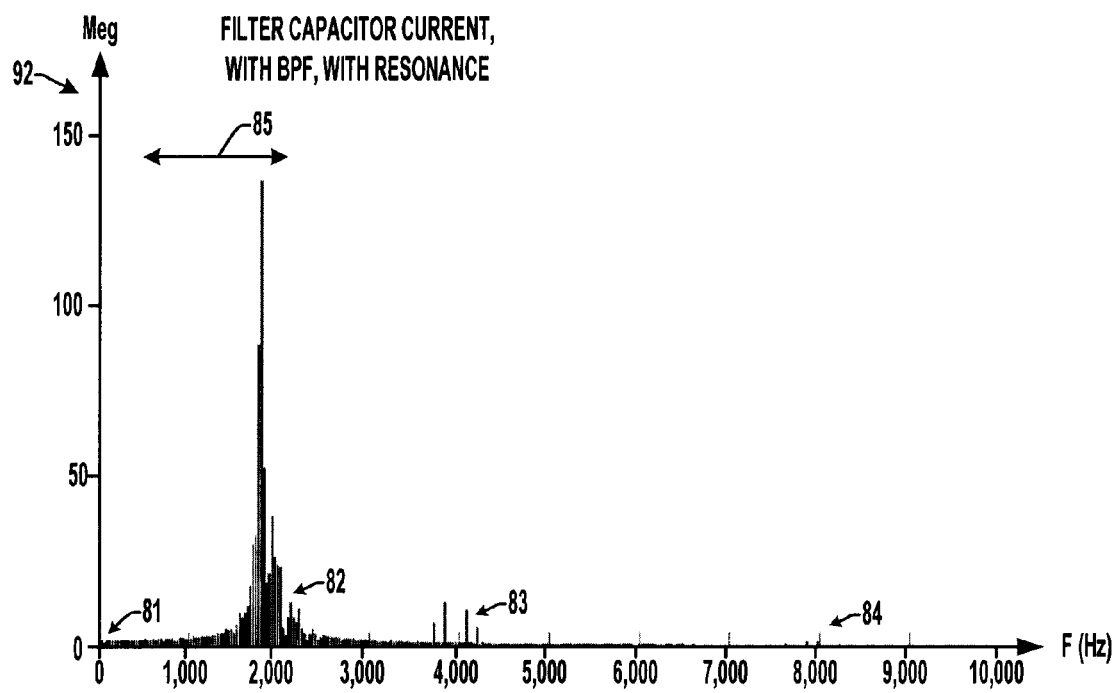

FIGS. 12-15 provide graphs 80, 86, 90 and 92, respectively, illustrating frequency spectrums based on Fourier transforms of filter capacitor currents. FIGS. 12 and 13 illustrate graphs 80 and 86 showing the frequency components before and after bandpass filtering, respectively, for no system resonance, while FIGS. 14 and 15 illustrate graphs 90 and 92 showing the frequency components before and after bandpass filtering, respectively, for resonant conditions in the power converter 2. As shown FIGS. 12-15, the fundamental power supply frequency component 81 (e.g., 50 or 60 Hz) is well below the rectifier switching frequency components 83 (e.g. around 4 kHz in one embodiment), and resonant frequencies 82 in the illustrated system 2 are primarily found in a predetermined frequency band between about 500 Hz and about 2200 Hz in certain embodiments. In addition, the switching operation of the active front end rectifier 30 (FIG. 7 above) may generate harmonics 84 far above the resonant frequency band of interest.

As seen in the graphs 80 and 90 of FIGS. 12 and 14, the frequency components in the predetermined frequency band (e.g., 500-2200 Hz) are significantly higher during system resonance (FIG. 14) than otherwise (FIG. 12), and the FFT implementation of FIG. 11 can perform threshold comparison of the amplitudes of components in this predetermined frequency band to selectively identify suspected resonance conditions. With bandpass filtering (e.g., using the bandpass filter 61 in the controller 60) the signal spectrum (FIGS. 13 and 15) following the bandpass filter can also be used to selectively identify suspected resonance in the converter 2, wherein the frequency components within the predetermined frequency band 85 are significantly larger during resonance (FIG. 15) than otherwise (FIG. 13). The inventors have thus appreciated that the above-described bandpass filtering in combination with mean or RMS computations can be used with suitable threshold values 65 for selectively identifying suspected resonance conditions and a power conversion system 2. In addition, as seen in FIGS. 13 and 15, Fourier analysis can also be used to detect the differences between the amplitudes of the THD in the frequency band 85 for resonant conditions and for normal (no resonance) conditions.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A power conversion system, comprising:
an AC input coupleable to receive AC input power from a power source;
a rectifier operative to convert the AC input power to provide a DC output;
an inverter operatively coupled with the DC output of the rectifier to provide an AC output;
a filter circuit coupled between the AC input and the rectifier, the filter circuit comprising a plurality of filter capacitors; and
a controller operative to identify a suspected resonance condition in the filter circuit if a component of at least one filter current flowing in at least one of the filter capacitors in a predetermined frequency band exceeds a predetermined threshold, and to chan e an operating state of the power conversion system or an external device in response to identification of the suspected resonance condition in the filter circuit.

2. The power conversion system of claim 1, wherein the controller comprises a bandpass filter operative to determine the component of the at least one filter current in the predetermined frequency band, the bandpass filter having an upper cutoff frequency below a switching frequency of the rectifier, and a lower cutoff frequency above a fundamental frequency of the at least one filter current signal or value.

3. The power conversion system of claim 2, wherein the upper cutoff frequency is about 2,200 Hz or less and wherein the lower cutoff frequency is about 500 Hz or more.

4. The power conversion system of claim 3, wherein the lower cutoff frequency is about 600 Hz or more.

5. The power conversion system of claim 3, wherein the controller samples the at least one filter current at a sample frequency of about 22 KHz or more.

6. The power conversion system of claim 2, wherein the controller is operative to identify a suspected resonance condition in the filter circuit if a mean value of the component of the at least one filter current in the predetermined frequency band exceeds the predetermined threshold.

7. The power conversion system of claim 6, wherein the filter circuit is an LCL circuit with first and second inductors connected in series with one another between each input terminal of the AC input and a corresponding input phase of the rectifier, with at least one of the plurality of filter capacitors connected to a center node between the first and second inductors, and wherein the at least one filter current represents at least one line current flowing in one or more of the second inductors of the filter circuit.

8. The power conversion system of claim 2, wherein the controller is operative to identify a suspected resonance condition in the filter circuit if an RMS value of the component of the at least one filter current in the predetermined frequency band exceeds the predetermined threshold.

9. The power conversion system of claim 8, wherein the filter circuit is an LCL circuit with first and second inductors connected in series with one another between each input terminal of the AC input and a corresponding input phase of the rectifier, with at least one of the plurality of filter capacitors connected to a center node between the first and second inductors, and wherein the at least one filter current represents at least one line current flowing in one or more of the second inductors of the filter circuit.

10. The power conversion system of claim 1, wherein the controller is operative to identify a suspected resonance condition in the filter circuit if a total harmonic distortion value in the predetermined frequency band of a Fourier transform of the at least one filter current exceeds the predetermined threshold.

11. The power conversion system of claim 1, wherein the controller is operative to adjust the predetermined threshold based on a measured condition in the power conversion system.

12. The power conversion system of claim 1, wherein the predetermined threshold is determined according to at least one of a power conversion system frame size, a power converter voltage class and a tolerance value associated with the filter capacitors.

13. The power conversion system of claim 1, wherein the controller is operative to change the operating state of the power conversion system or the external device in response to identification of the suspected resonance condition in the filter circuit by at least one of:
opening a main circuit breaker of the power conversion system;
initiating a controlled shutdown of the power conversion system;
indicating the suspected resonance condition on a user interface of the power conversion system;
logging a fault in the power conversion system; and
storing a value to a fault log in a nonvolatile memory of the power conversion system.

14. The power conversion system of claim 1, wherein the controller is operative to change the operating state of the power conversion system or the external device in response to identification of the suspected resonance condition in the filter circuit by at least one of:
sending an error message to a supervisory controller associated with the power conversion system;
indicating a non-resettable fault to a human machine interface for different levels of suspected resonance according to a relative comparison with the predetermined threshold; and
allowing a fault to be reset upon input by service personnel after system inspection.

15. A method for detecting resonance in a multiphase power conversion system, the method comprising:
receiving or analyzing at least one filter current signal or value representing at least one filter current flowing in a filter capacitor of the power conversion system; and
selectively identifying a suspected resonance condition in the power conversion system if a component of the at least one filter current signal in a predetermined frequency band exceeds a predetermined threshold; and
changing an operating state of the power conversion system or an external device in response to identification of the suspected resonance condition in the filter circuit.

16. The method of claim 15, comprising:
filtering the at least one filter current signal or value using a bandpass filter;
computing at least one mean value based on the filtered current signal or value;
comparing the at least one mean value to the predetermined threshold; and
selectively identifying a suspected resonance condition in the power conversion system if the at least one mean value exceeds the predetermined threshold.

17. The method of claim 15, comprising:
filtering the at least one filter current signal or value using a bandpass filter;
computing at least one RMS value based on the filtered current signal or value;
comparing the at least one RMS value to a predetermined threshold; and
selectively identifying a suspected resonance condition in the power conversion system if the at least one RMS value exceeds the predetermined threshold.

18. The method of claim 15, comprising filtering the at least one filter current signal or value using a bandpass filter having an upper cutoff frequency of about 2,200 Hz or less and a lower cutoff frequency of about 500 Hz or more.

19. The method of claim 15, comprising sampling the at least one filter current signal or value at a sample frequency of about 22 KHz or more.

20. A non-transitory computer readable medium with computer executable instructions for detecting resonance in a multiphase power conversion system, the computer readable medium comprising computer executable instructions for:
receiving or analyzing at least one filter current signal or value representing at least one filter current flowing in a filter capacitor of the power conversion system; and
selectively identifying a suspected resonance condition in the power conversion system if a component of the at least one filter current signal or value in a predetermined frequency band exceeds a predetermined threshold; and
changing an operating state of the power conversion system or an external device in response to identification of the suspected resonance condition in the filter circuit.

* * * * *

UNITED STATES PATENT AND TRADEMARK OFFICE
CERTIFICATE OF CORRECTION

PATENT NO. : 9,667,128 B2
APPLICATION NO. : 13/570919
DATED : May 30, 2017
INVENTOR(S) : Yogesh Popatlal Patel et al.

Page 1 of 1

It is certified that error appears in the above-identified patent and that said Letters Patent is hereby corrected as shown below:

In the Claims

In Claim 1, Column 12, Line 49, "a predetermined threshold, and to chan e an operating" should read as follows --a predetermined threshold, and to change an operating--.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*